United States Patent [19]

Joubert et al.

[11] 4,411,589

[45] Oct. 25, 1983

[54] RETAINING DEVICE FOR THE COMPRESSOR CASING OF A TURBINE ENGINE

[75] Inventors: Raymond J. M. Joubert, Savigny sur Orge; Marcel R. Soligny, Chevilly-Larue, both of France

[73] Assignee: Societe Nationale d'Etude et de Construction de Moteurs d'Aviation, "S.N.E.C.M.A.", France

[21] Appl. No.: 199,192

[22] Filed: Oct. 21, 1980

[30] Foreign Application Priority Data

Oct. 23, 1979 [FR] France .................. 79 26580

[51] Int. Cl.³ .................. F01D 21/00
[52] U.S. Cl. .................. 415/9; 415/121 G; 415/174; 415/197; 415/219 R
[58] Field of Search .................. 415/121 G, 9, 170 R, 415/174, 197, 219 R, 219 C; 416/174

[56] References Cited

U.S. PATENT DOCUMENTS

| 3,241,813 | 3/1966 | Von Flue et al. | 415/9 |
| 3,556,675 | 1/1971 | Howald et al. | 415/214 |
| 4,063,847 | 12/1977 | Simmons | 415/219 R X |
| 4,120,605 | 10/1978 | Hurst | 415/197 X |
| 4,197,052 | 4/1980 | Lardellier | 415/9 X |

FOREIGN PATENT DOCUMENTS 110760 7/1939 Australia .................. 415/197

Primary Examiner—Harvey C. Hornsby
Assistant Examiner—Christine A. Peterson
Attorney, Agent, or Firm—Bacon & Thomas

[57] ABSTRACT

A ferrule surrounding the blading of a rotor is lined externally with an assembly of elements of revolution. These elements are in the form of cylindrical rings, circular rings or of tori supported between blocking elements. The assembly is formed by alternating rings made of a composite or metallic material and a winding of fibers encased in a polymerizable resin.

7 Claims, 6 Drawing Figures

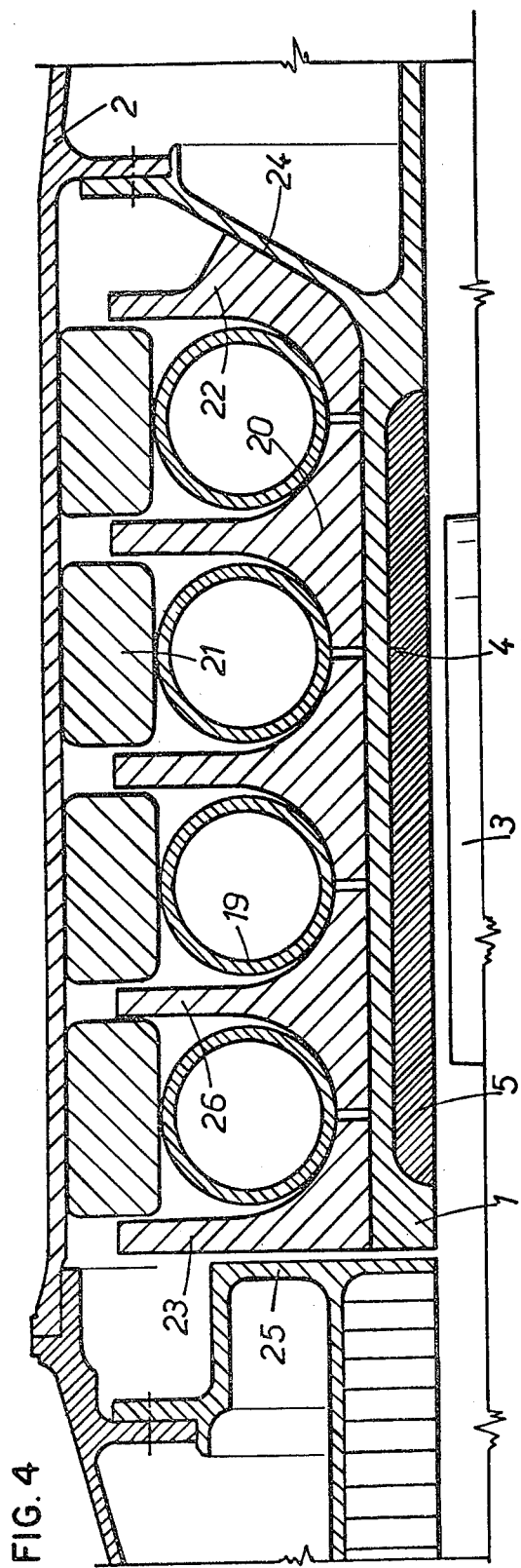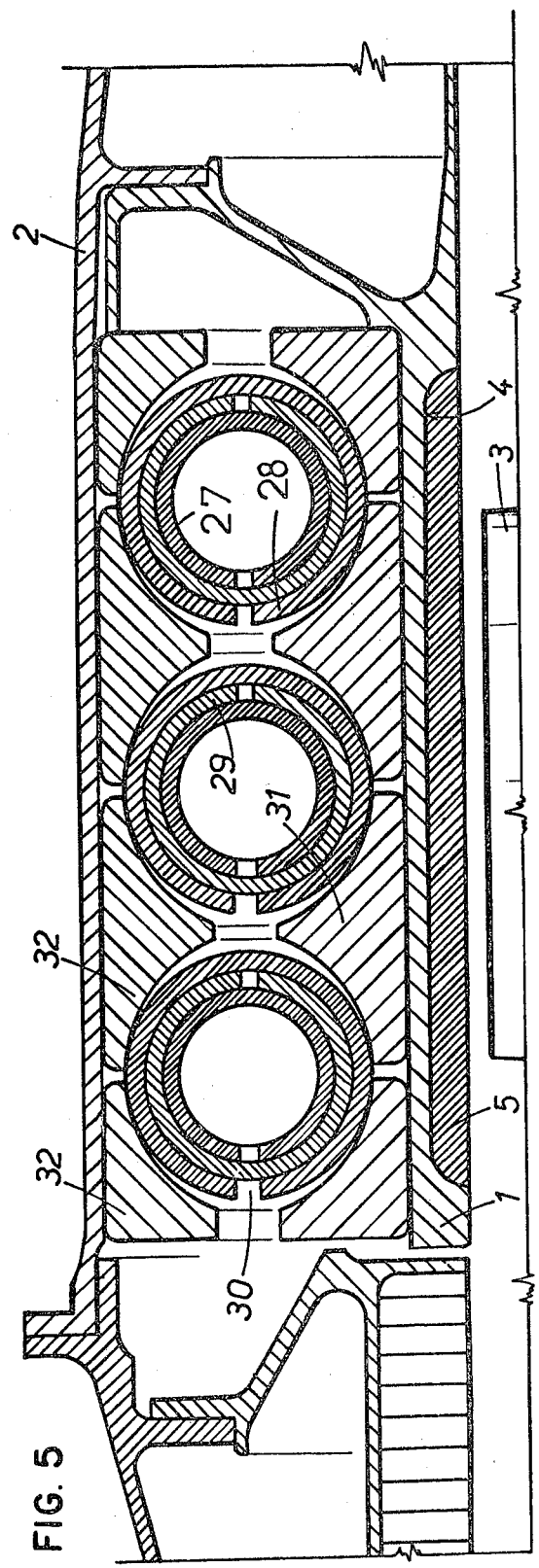

RETAINING DEVICE FOR THE COMPRESSOR CASING OF A TURBINE ENGINE

BACKGROUND OF THE INVENTION

The retention of blade fragments from the rotors of turbine engines rotating at a high velocity has rendered the develpment of devices for the removal of the blade or of the fragment without their damaging the rest of the blading, necessary. The devices known heretofore are intended either to retain the fragments resulting from the fracture, or to fragment them so that they may be removed without damage.

U.S. Pat. No. 3,241,813 describes a device for the retention of fragments of the rotor of a turbine. A ring made of a high strength material surrounds the rotor and supports an annular body consisting of a metal capable of resisting the impact of the fragments without the risk of failure. The annular body, facing the blades of the rotor, represents an annular conduit.

Part of the kinetic energy of the blade fragment or blade ejected is dissipated, during its impact, by the deformation or fracture of the annulus, and the rest of the energy by the friction of the annulus and the annular body in the casing wherein they are secured by shrinkage.

In a second form of embodiment described, the annular conduit is lined internally by a material that is softer than that of the annular conduit so as to permit its penetration by the fragments while expending their energy and their retention therein. The material selected is aluminum.

The above-described devices are effective but have the disadvantage of being rather heavy. In fact, the materials used for the annulus and the annular body are generally high strength steels with a relatively large thickness. The result is an appreciable increase in the weight of the aircraft. The replacement of steel by titanium, which has a lower specific gravity, reduces the weight but increases the cost of manufacture.

French Pat. No. 1,604,806 describes structures capable of resisting the projectiles and consisting of layers of a fibrous material and layers formed of pieces of a rigid materials having a diamond hardness higher than 700. These rigid pieces are rods or thick walled tubes, balls, natural gravel or pebbles. The density of the plates obtained in this manner is of the order of 2.5. The rigid pieces have the function not only of resisting the action of a projectile, but also of deflecting and inducing its fracturing into fragments.

The production of a retaining structure for the casing of a compressor based in the teaching of the latter patent has not been eased by its use of a very hard material. The assembly of these armor elements does not lend itself to the formation of cylindrical layers that would facilitate the displacement of the blade fragment or of the blade in the material and the progressive absorption of its kinetic energy.

SUMMARY OF THE INVENTION

It is the object of the invention to provide a device having a structure consisting of a specific assembly of materials, at least part of which is of low density.

The casing to be protected comprises, according to the invention, a metal ferrule coaxial with the axis of the compressor, carrying on the inside, facing the tips of the blades, a material capable of entering into nondestructive contact with the tips of the blades, said ferrule being doubled on the outside by a coaxial annular structure consisting of an assembly of elements of revolution coaxial with the axis of the compressor.

According to the forms of embodiment, the elements of revolution are circular or cylindrical rings placed adjacently against each other and made alternately of different materials.

BRIEF DESCRIPTION OF THE DRAWINGS

The explanations and figures given hereinbelow as examples will aid in understanding how the invention may be embodied.

FIGS. 4 and 5 represent two embodiments of a structure comprising a plurality of tori.

DESCRIPTION OF THE PREFERRED EMBODIMENTS

Figure 1:
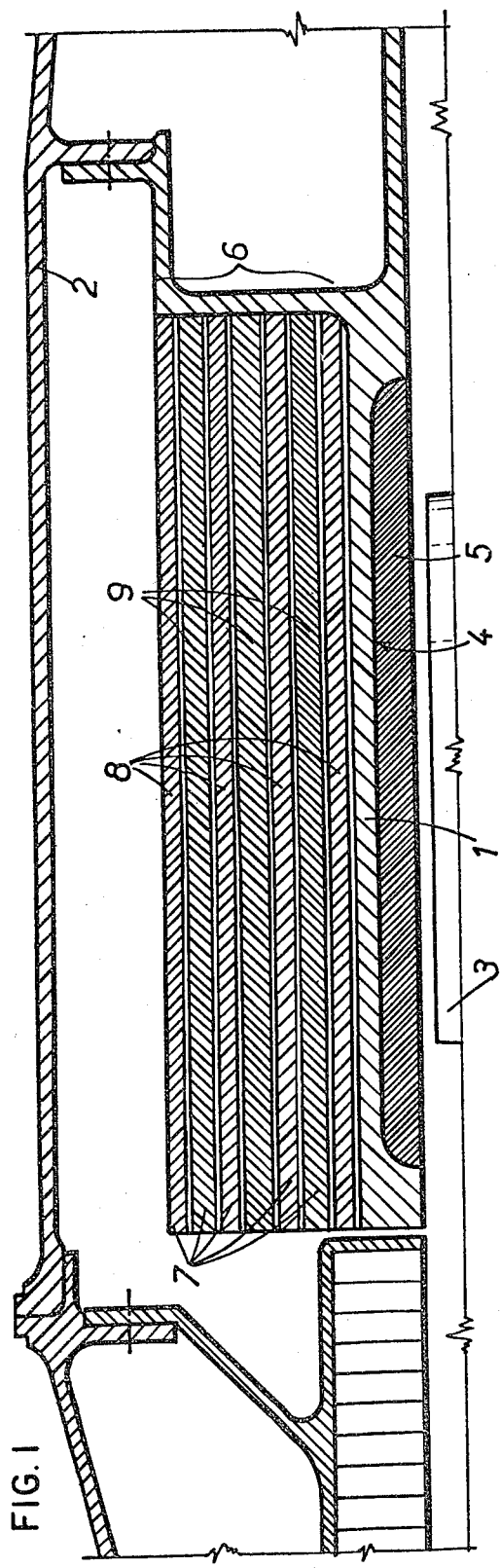
FIG. 1 represents a first embodiment of the invention with a structure consisting of cylindrical rings.

The retaining device for the casing of a compressor of a dual flow turbo-jet engine consists of a metal ferrule 1, preferably of steel or titanium, attached to the inside of the casing of the compressor 2. Facing the blades 3 of the compressor, a groove 4 of the ferrule 1 receives a material 5 capable of entering into nondestructive contact with the tips of the blades and acting as a seal.

On its external diameter, the ferrule 1 is overlipped by a coaxial annular structure consisting of an assembly 6 of elements 7 of revolution coaxial with the axis of the compressor.

According to the embodiment of FIG. 1, the elements of revolution consists of cylindrical rings made of two types of materials placed alternately. For example, the rings 8 are formed by a winding of polyimide fibers, encased in a matrix of a polymerizable resin having the function of amortizing by means of friction of the kinetic energy of the fragment or the blade ejected, and the rings 9 by a composite material: resins, glass, carbon, boron-aluminum fibers.

The different rings are placed in the form of successive layers directly onto the ferrule which serves as a molding material.

Figure 2B:
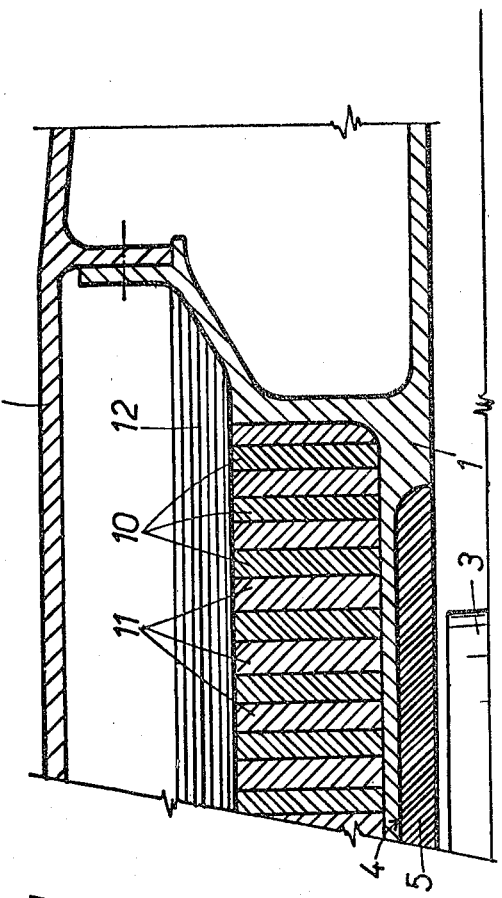
FIGS. 2A and 2B show a second embodiment wherein the structure consists of circular rings.
Figure 2A:
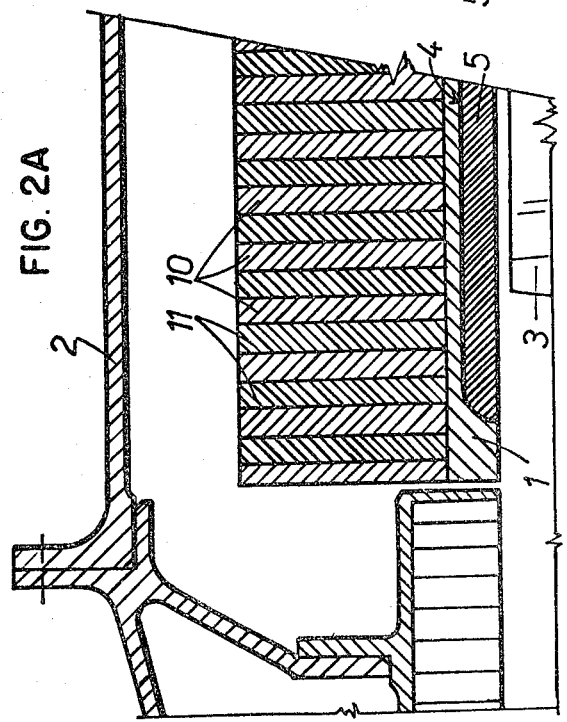

FIGS. 2A and 2B show a second embodiment wherein the elements of revolution consist of circular rings 10 and 11, coaxial with the axis of the compressor and placed against each other on the external surface of the ferrule 1. These rings may consist of the same material as those described in the preceding example, of composite materials or also of a titanium core covered with composites. The rings are adhesively bonded or vulcanized to each other.

FIG. 2B further shows an external annular winding 12, consisting for example of a polyimide fiber, encased or not in a synthetic resin which holds the assembly together.

Figure 3:
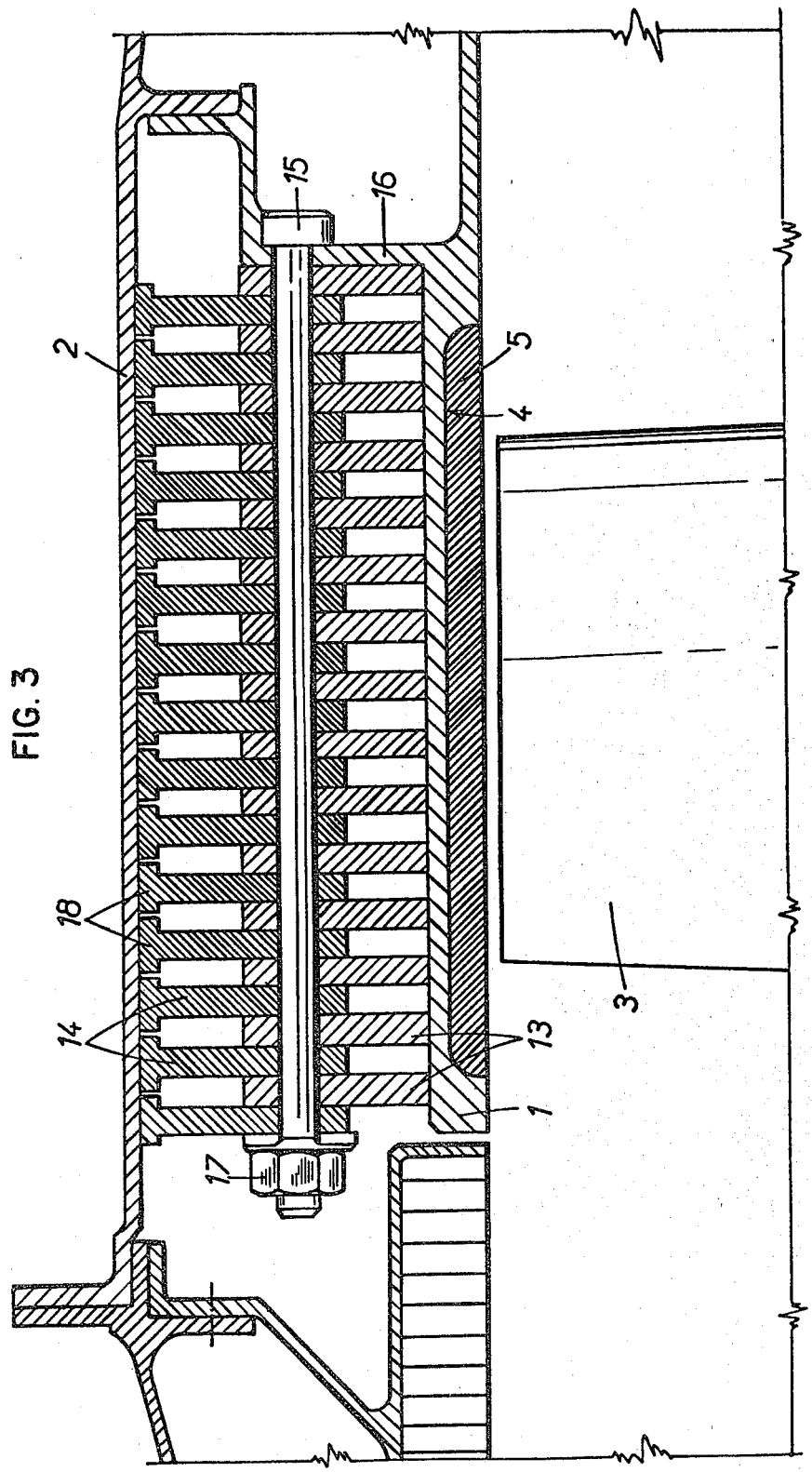
FIG. 3 is a third embodiment wherein the circular rings are staggered.

The embodiment represented in FIG. 3 is formed by circular rings having different diameters. A series 13 of rings has an internal diameter corresponding to the external diameter of the ferrule 1, while the other series 14 of rings has an external diameter corresponding to the internal diameter of the housing 2 of the compressor. The external diameter of the rings 13 is larger than the internal diameter of the rings 14. The overlapping is sufficient to allow the drilling of a cylindrical hole of a diameter corresponding to that of the supporting tie-rods 15. These tie-rods extend through integral parts of the ferrule 1 and parallel to the axis of the compressor. They pass through the rings and keep them tightly secured against each other by means of a nut 17.

The rings 14 with the larger diameter are provided on their external peripheral edge with a rim 18 which, in the embodiment shown, are in the form of cylindrical rings approximately centered with respect to the plane of the circular ring.

The dissipation of the energy of the fragments ejected is obtained by the compression of the material of the disks and the tensile stressing of the internal fibers.

According to the embodiments shown in FIGS. 4 and 5, the coaxial elements of revolution are formed by hollow tori 19 supported by the blocking elements 20 and 21, arranged respectively between the external wall of the ferrule 1 and a part of the surface of the tori and between the internal wall of the casing 2 and a part of the surface of the tori.

The blocking elements are of different configurations depending on their position. The internal elements 20 have a somewhat triangular cross section. The base cooperates with the external surface of the ferrule 1 and the curvilinear sides have a configuration that is at least in part complementary with respect to a part of the tori. Each element is placed between two tori. The terminal elements 22 and 23 are in the form of a semi-element with the shape of their side not adjacent to the torus being determined by the supporting walls 24 and 25 of the ferrule.

The spaces between the larger diameter of the tori, the ends 26 of the blocking elements 20, 22 and 23 and the casing 2, are filled at least in part by the blocking elements 21 consisting of wide cylindrical rings.

According to an embodiment not shown, the rings 21 have on their side cooperating with the torus a corresponding semi-torical surface.

The tori may, for example, be formed of wound fiberglass or carbon fiber tubes bonded by a polymerizable resin and the blocking elements of composite materials, polyimide, glass or carbon fibers encased in a polymerizable resin or a boron-aluminum composite.

FIG. 5 is a variant of the preceding embodiment wherein the tori are a plurality of concentric envelopes made of different materials: the envelopes 27 and 28 are composites, while the envelope 29 is made of metal. Each envelope comprises a slit 30 perpendicular to the plane of the torus, with the slits of two adjacent envelopes being opposed to each other.

The blocking elements 31 and 32 in this example are similar to and are made of the same material as those in the preceding example. In order to facilitate the assembly operation, at least the elements placed between the ferrule 1 and the tori are divided into three sections.

We claim:

1. A retaining device for the compressor casing of a dual flow turbo-jet engine having a metal ferrule coaxial with the axis of the compressor, the metal ferrule having on its internal surface facing the tips of the blades a material capable of entering into non-destructive contact with the tips of the blades, wherein the retaining device comprises: a plurality of first circular rings disposed about the external surface of the ferrule such that their axes coincide with the axis of the compressor, the first circular rings of material capable of frictionally amortizing the kinetic energy of a blade or blade fragment coming into contact therewith; and, a plurality of second circular rings disposed coaxially with the first circular rings and located between each of the first rings such that the first and second rings alternate in a direction along the axis of the compressor, the second circular rings being formed of a high-strength material different from the material forming the first rings.

2. The retaining device for a compressor casing set forth in claim 1 wherein the dimensions of the first and second rings in a direction along the longitudinal axis of the compressor are smaller than their dimensions in a radial direction.

3. The retaining device for a compressor casing set forth in claim 2 wherein the internal diameters of the first and second rings are approximately equal to the external diameter of the ferrule, and the external diameters of the first and second rings are substantially smaller than the internal diameter of the compressor casing.

4. The retaining device for a compressor casing set forth in claim 3 wherein the first rings are formed of polyimide fibers encased in a matrix of polymerizable resin.

5. The retaining device for a compressor casing set forth in claim 4 wherein the second rings are formed of a composite material.

6. The retaining device for a compressor casing set forth in claim 5 wherein the first and second rings are adhesively bonded to each other.

7. The retaining device for a compressor casing set forth in claim 6 wherein the first and second rings are joined to each other by vulcanizing.

* * * * *